(12) United States Patent
Grauer

(10) Patent No.: US 8,691,139 B2
(45) Date of Patent: Apr. 8, 2014

(54) COMPONENT MOUNTING ARRANGEMENT

(71) Applicant: TI Automotive Technology Center GmbH, Rastatt (DE)

(72) Inventor: Peter Grauer, Steinweiler (DE)

(73) Assignee: TI Automotive Technology Center GmbH, Rastatt (DE)

( * ) Notice: Subject to any disclaimer, the term of this patent is extended or adjusted under 35 U.S.C. 154(b) by 0 days.

(21) Appl. No.: 13/737,174

(22) Filed: Jan. 9, 2013

(65) Prior Publication Data

US 2013/0119578 A1 May 16, 2013

Related U.S. Application Data

(62) Division of application No. 12/964,178, filed on Dec. 9, 2010, now Pat. No. 8,377,368.

(60) Provisional application No. 61/285,700, filed on Dec. 11, 2009.

(51) Int. Cl.
*B29C 45/14* (2006.01)

(52) U.S. Cl.
USPC ........... 264/516; 264/319; 264/259; 264/263; 425/117

(58) Field of Classification Search
USPC ........ 264/259, 263, 320, 319, 27.1, 516, 545; 425/117
See application file for complete search history.

(56) References Cited

U.S. PATENT DOCUMENTS

| | | | |
|---|---|---|---|
| 3,953,273 A | 4/1976 | Faller | |
| 4,957,680 A | 9/1990 | Saxod et al. | |
| 5,582,789 A * | 12/1996 | Stein et al. | 264/46.4 |
| 5,902,536 A * | 5/1999 | Shumaker et al. | 264/263 |
| 6,503,355 B1 | 1/2003 | Anzani et al. | |
| 6,730,247 B2 | 5/2004 | De Winter et al. | |
| 7,153,461 B2 * | 12/2006 | Yang | 264/257 |
| 7,192,543 B2 | 3/2007 | Malfliet et al. | |
| 7,789,987 B2 | 9/2010 | Nemoto | |

(Continued)

FOREIGN PATENT DOCUMENTS

| EP | 875411 | 11/1998 |
|---|---|---|
| FR | 2918595 A1 | 1/2009 |

(Continued)

OTHER PUBLICATIONS

Partial International Search Report for PCT/EP10/69387, mailed Jun. 30, 2011, 2 pages.

(Continued)

*Primary Examiner* — Joseph S Del Sole
*Assistant Examiner* — Nahida Sultana
(74) *Attorney, Agent, or Firm* — Reising Ethington P.C.

(57) ABSTRACT

A method of connecting a component to a molded article may include disposing a component adjacent to a wall of the article being molded, overlapping a portion of the component with a portion of the wall of the article being molded while the wall is still at least partially molten, and permitting the wall of the article being molded to cool with said portion of the component still overlapped by the wall. Preferably, a portion of the component is overlapped on two sides by the wall of the article being molded to firmly retain the component relative to the article after the article is formed. The article may be a receptacle, or any other object, as desired.

9 Claims, 4 Drawing Sheets

(56) References Cited

U.S. PATENT DOCUMENTS

| | | | |
|---|---|---|---|
| 7,906,062 B2 | 3/2011 | Borchert et al. | |
| 8,038,914 B2 | 10/2011 | Suzuki et al. | |
| 8,070,901 B2 * | 12/2011 | Petersson et al. | 156/214 |
| 8,137,423 B2 | 3/2012 | Lise et al. | |
| 8,137,494 B2 | 3/2012 | Cooper et al. | |
| 8,202,074 B2 | 6/2012 | Toda et al. | |
| 8,377,368 B2 * | 2/2013 | Grauer | 264/516 |
| 2002/0017745 A1 | 2/2002 | Vorenkamp et al. | |
| 2007/0016168 A1 | 1/2007 | Conway | |
| 2008/0061470 A1 | 3/2008 | Borchert et al. | |
| 2008/0079195 A1 * | 4/2008 | Chan | 264/271.1 |
| 2009/0072441 A1 * | 3/2009 | Bracke | 264/271.1 |
| 2009/0324866 A1 | 12/2009 | Bocker et al. | |
| 2011/0068596 A1 * | 3/2011 | Someschan et al. | 296/1.08 |

FOREIGN PATENT DOCUMENTS

| | | |
|---|---|---|
| JP | 2006103116 | 4/2006 |
| NL | 7706964 | 12/1978 |
| WO | WO2005118255 A1 | 12/2005 |
| WO | WO2006023178 A1 | 3/2006 |
| WO | WO2009043660 A2 | 4/2009 |
| WO | WO2011070159 A2 | 6/2011 |

OTHER PUBLICATIONS

PCT Search Report for PCT/EP10/69387, mailed Oct. 11, 2011, 5 pages.

* cited by examiner

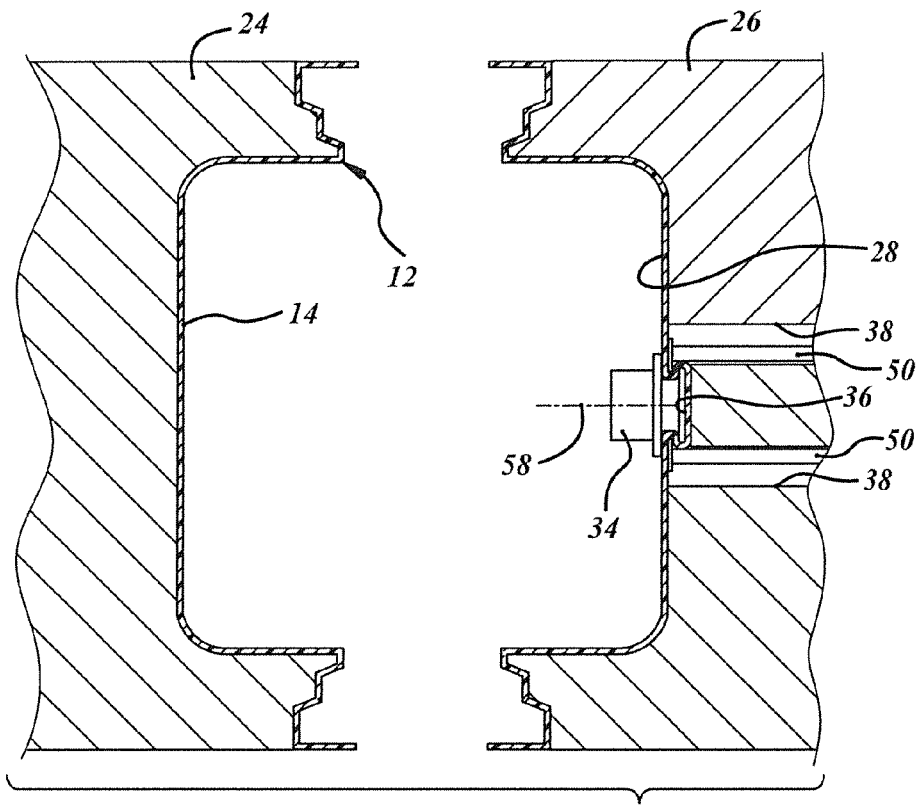
FIG. 2
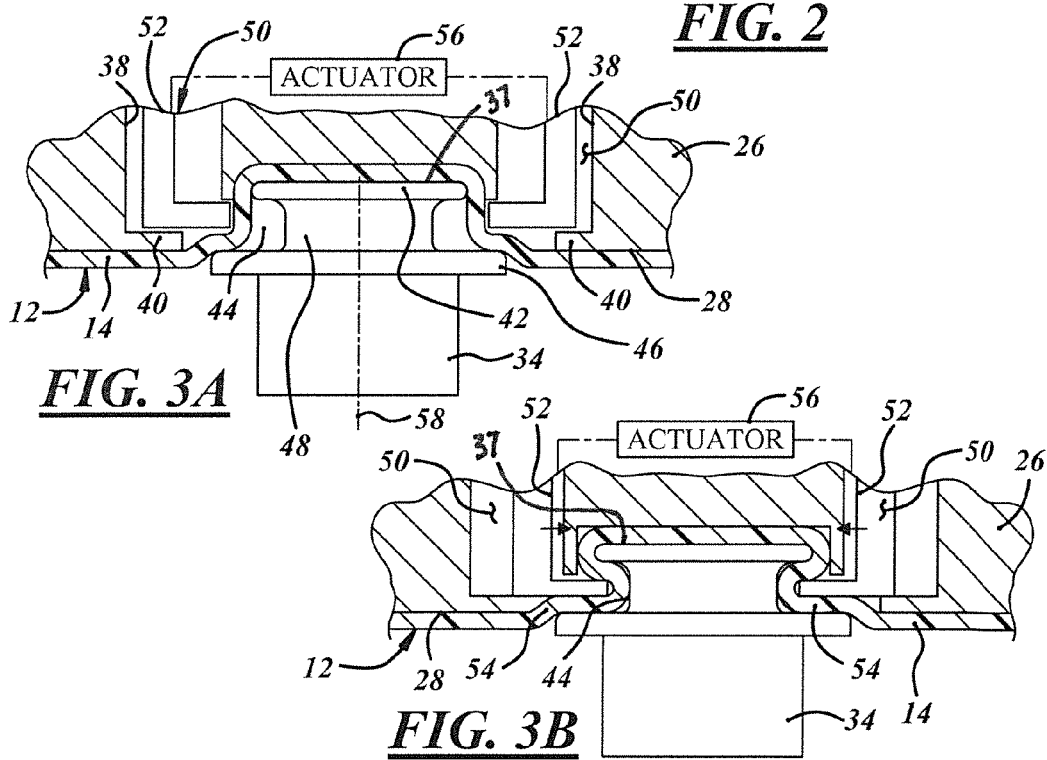
FIG. 3A
FIG. 3B

COMPONENT MOUNTING ARRANGEMENT

REFERENCE TO COPENDING APPLICATION

This application is a divisional of U.S. application Ser. No. 12/964,178 filed Dec. 9, 2010 and claims the benefit of U.S. Provisional application Ser. No. 61/285,700 filed Dec. 11, 2009, which are incorporated herein by reference in their entirety.

TECHNICAL FIELD

The present disclosure relates generally to an arrangement for mounting a component relative to another component.

BACKGROUND

Receptacles may include components within their interior volume, or connected to their exterior. For example, fuel tanks for vehicles typically include a fuel pump, one or more valves, a fuel level sensor and perhaps other components arranged within the fuel tank. The components may be mounted on a carrier or other support that is placed in the fuel tank, or the components may be attached to a flange that is secured on an already formed fuel tank wall, such as by a clamp or threaded connection.

SUMMARY

A method of connecting a component to a molded article may include disposing a component adjacent to a wall of the article being molded, overlapping a portion of the component with a portion of the wall of the article being molded while the wall is still at least partially molten, and permitting the wall of the article being molded to cool with said portion of the component still overlapped by the wall. Preferably, a portion of the component is overlapped on two sides by the wall of the article being molded to firmly retain the component relative to the article after the article is formed. The article may be a receptacle, or any other object, as desired.

A method of forming a molded article with a component attached to the article may include several steps, including:

providing a molten parison into a mold cavity defined by at least two molds;

forming the parison into the mold cavity;

severing at least a portion of the parison;

separating at least two of the molds to also separate portions of the severed parison and expose an interior of the parison;

disposing a component adjacent to a wall of the parison;

overlapping a portion of the component with a portion of the wall of the parison while the wall is still at least partially molten; and closing said at least two of the molds to define an enclosed mold cavity and join together again the severed portions of the parison. In this way, the parison can be opened to permit one or more components to be received within an interior of the parison and closed to seal the severed portions of the parison together for final forming or curing.

In one form, a system for attaching a component to a receptacle may include a mold defining part of a forming surface against which the receptacle is molded, and at least one tool cavity open to the forming surface, a tool disposed at least partially within the tool cavity and movable relative to the forming surface from a retracted position to an advanced position. The tool may have a working surface that engages material forming the receptacle at least when the tool is moved to its advanced position to overlap a portion of the component with material forming the receptacle to hold said component in position relative to the receptacle.

BRIEF DESCRIPTION OF THE DRAWINGS

The following detailed description of exemplary embodiments and best mode will be set forth with reference to the accompanying drawings, in which:

FIG. 2 is a cross-sectional view of the blow molding apparatus of FIG. 1 illustrating a component positioned between separated halves of the parison and blow mold, and being connected to the parison;

FIG. 3A is an fragmentary side view, partially in section, showing a component within a recess of a mold, and tools prior to engaging the parison;

FIG. 3B is a view similar to FIG. 3A, showing tools engaging the parison to overlap a portion of the component with the parison;

DETAILED DESCRIPTION OF PRESENTLY PREFERRED EMBODIMENTS

Figure 1:
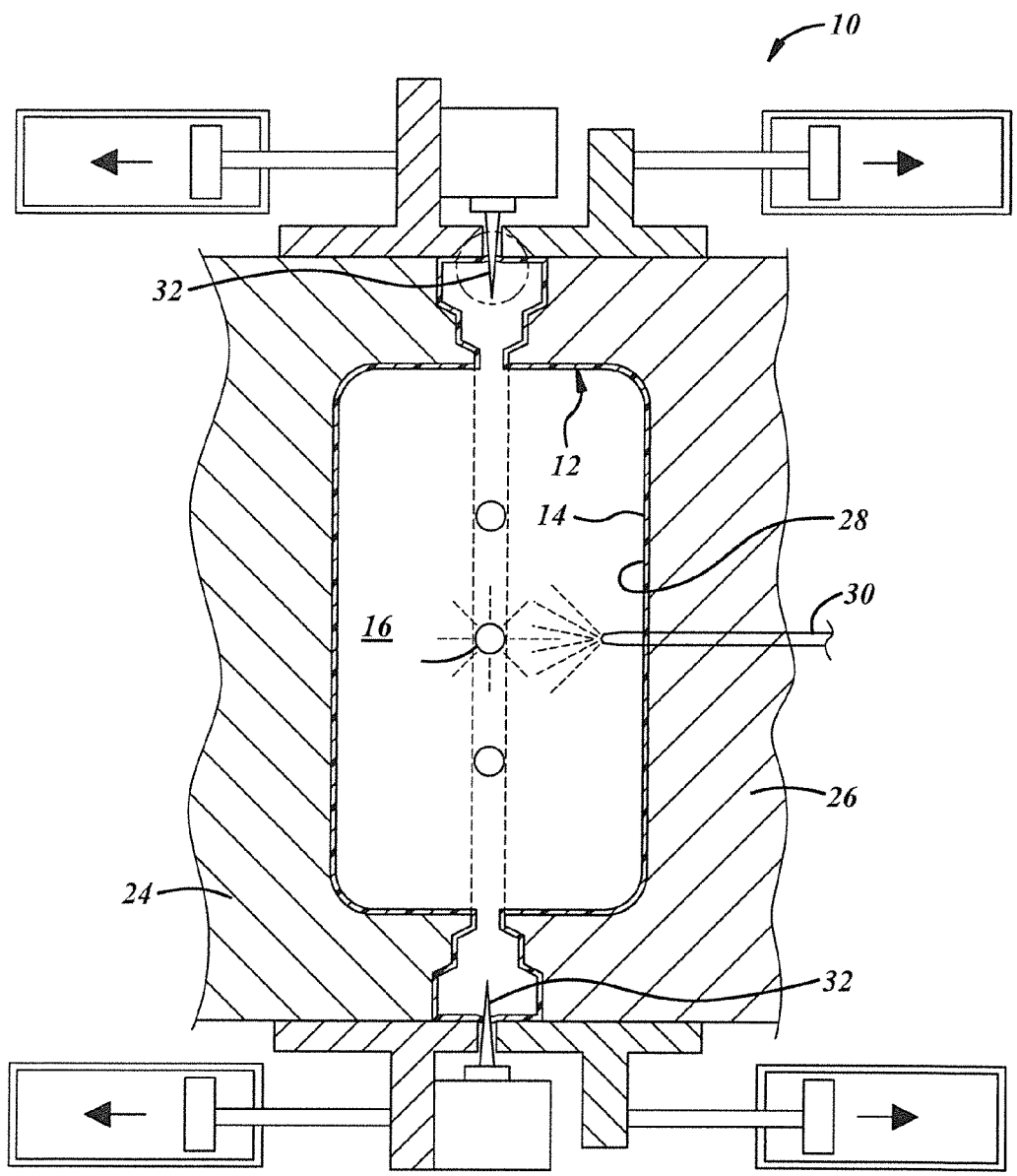
FIG. 1 is a cross-sectional view of one exemplary implementation of a blow molding apparatus that may be used to form a receptacle.
Figure 4:
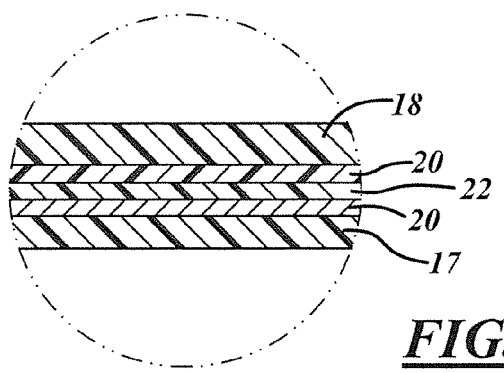
FIG. 4 is a fragmentary sectional view of one exemplary parison construction.

Referring in more detail to the drawings, FIG. 1 illustrates a blow molding apparatus 10 that may be used to form an article from a molten parison 12. In one implementation, the article may be a receptacle, such as a fuel tank used in a vehicle fuel system. Of course, the receptacle could be used to contain something other than fuel. In the example of a fuel tank, the fuel tank may include one or more walls 14 defining an internal volume 16 in which the fuel is contained. The fuel tank wall(s) 14 may be formed of any suitable material(s). In one form, the fuel tank may be formed from several layers of polymeric materials, in a so-called "multi-layer" fuel tank. As shown in FIG. 4, the various layers may include one or more structural layers which may form inner and outer layers 17, 18 formed of HDPE or the like, one or more adhesive layers 20 and one of more barrier layers 22 having a desired resistance to permeation therethrough of hydrocarbon or other vapors or liquids associated with the fluid contained within the fuel tank. Exemplary barrier layer materials include nylons and EVOH (ethylene vinyl alcohol), although others may be used. Alternatively, the tank could be formed from a single material, or could have layers in addition to or other than those specifically noted herein.

In forming a hollow receptacle such as a fuel tank, the parison may be introduced into a blow mold apparatus 10 having a mold cavity defined by one or more molds 24, 26 collectively defining a forming surface 28 against which the parison 12 is inflated by introduction of pressurized gas through a blow pin 30. In one implementation, the apparatus and method set forth in U.S. patent application Ser. No. 12/491,964 filed on Jun. 25, 2009, could be utilized, and the disclosure of that application is incorporated herein by reference in its entirety. In general, the parison 12 may be initially blow molded, than separated into two halves, such as by suitable cutters 32. The molds 24, 26 with the severed parison halves therein, can then be opened, as shown in FIG. 2. In this position, components can be inserted between the separated mold and parison halves, prior to joining together again the parison halves to finally form the receptacle. In this manner, various components 34 can be disposed within an interior volume of the receptacle, or, with appropriate modification of the molds 24, 26, could be disposed on or otherwise carried by an exterior of the receptacle.

In one implementation, as shown in FIGS. 2, 3A and 3B, at least one portion of the mold 24, 26 includes a recess 36 adapted to receive at least a portion of a component 34 to be connected to the receptacle. The mold 24, 26 may also include one or more openings or tool passages 38 that are open to the recess 36. The recess 36 may be formed in the forming surface 28 of the mold, and may define part of the forming surface of the mold. The tool passages 38 may be formed through the mold 24, 26 so that they open directly (or axially) to the interior of the mold. Or, as shown in FIGS. 3A and 3B, the tool passages 38 may be blind bores or otherwise terminate to open generally radially to the recess 36 and may define an inwardly extending flange 40, as shown in FIGS. 3A and 3B. In this form, the tool passages 38 may be formed from an opposite side of the mold 24, 26 as the forming surface 28, and may overlap, or intersect, or otherwise open or be opened into the recess 36. The recess 36 may be formed by a right cylindrical blind bore, or of any other shape and orientation, and the tool passages 38 may be formed by a straight bore open and parallel to the recess. Of course, other arrangements may be used.

Figure 11:
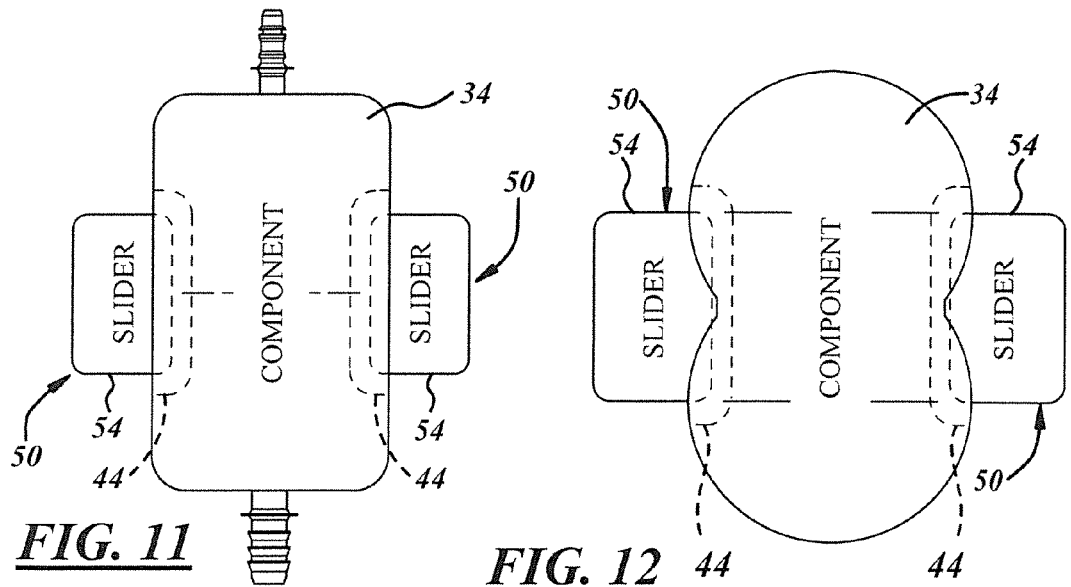
FIGS. 11 and 12 are diagrammatic plan views showing different implementations of a component.
Figure 12:
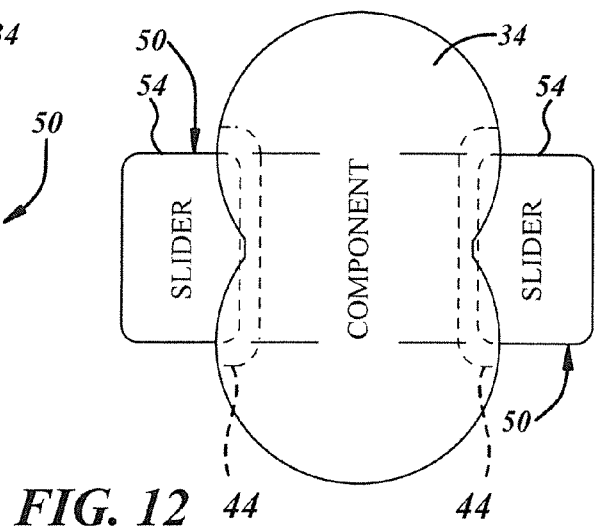

In one implementation, such as shown in FIGS. 2, 3A and 3B, a component 34 may include an end surface 37 and a radially outwardly extending flange 42 that defines part of an undercut, recess or void 44 adjacent to the flange. The component 34 may include a second flange 46 or other surface that defines a neck 48 between the two flanges 42, 46. The recess 36 in the mold 24, 26 may be sufficiently deep to enable the flange 42 to be at least partially received in the recess 36 and position the void 44 of the component 34 at least partially in the recess 36. The component 34 could have substantially any shape. Some representative shapes are shown, for example, in FIGS. 3, 11 and 12, but many others are possible. The flange 42 need not be circumferentially continuous. Indeed, no flange 42 or 46 need be provided. The void 44 provided in the component 34 in which the parison material is at least partially moved, need not be circumferentially continuous or extend all the way around the component. Rather, the void could include one or more cavities, undercuts, grooves, slots or the like, which could be provided in the component to receive some of the parison material as moved therein by the tools. And such voids can be spaced apart about the exterior of the component in any desired arrangement.

One or more tools 50 may be disposed in the tool passage 38 (or passages), adjacent to the recess 36, and movable relative to the recess 36. Each tool 50 may include an arm 52 and a working end 54 carried by the arm 52 and adapted to engage the parison 12. The tools 50 may be moved from a first position, retracted away from the component as shown in FIG. 3A, and a second position advanced toward the component as shown in FIG. 3B. The tools 50 may be driven between and to their retracted and advanced positions by one or more actuators 56. Of course, the tools 50 can be manually manipulated. The tools 50 may be driven along a linear path generally perpendicular to an axis 58 of the recess 36, or they may be driven along any suitable path between retracted and advanced positions as generally discussed above (for example, they may be pivoted along an arcuate path, rotated or some combination of multiple paths of movement, if desired).

As best shown in FIGS. 3A and 3B, insertion of the component 34 into the recess 36 engages the end surface 37 of the component with the parison and may also displace the adjacent portion of the parison 12, which is still at least partially molten and pliable, into the recess 36 and next to the tools 50. Thereafter, when the tools 50 are advanced from their refracted position, shown in FIG. 3A, to their advanced position, shown in FIG. 3B, a portion of the parison 12 is moved against the component 34 and/or into the void(s) 44 of the component 34 by the tools 50 so that a portion of the component 34 is overlapped by a portion of the parison wall 12. That is, a portion of the parison wall is folded over a portion of the component so that at least a portion of the component 34 is sandwiched or trapped between two portions of the parison wall, with the parison wall disposed adjacent opposed surfaces or sides of the wall of the component. The parison material may be sufficiently heated to affect a bonding or welding of the parison material to the material of the component 34 which may be formed of a suitably compatible polymeric material. Of course, such welding or bonding may not be necessary to effectively connect the component 34 to the parison 12 and finally formed receptacle in view of at least the manner in which the parison wall is overlapped about the component.

Upon final forming and cooling of the parison 12, the component 34 remains at least partially trapped or overlapped by the parison wall to retain the position of the component 34 relative to the finished receptacle. Again, in the implementation shown in FIGS. 2, 3A and 3B, the component 34 is attached adjacent to an interior surface of the parison wall 12 so that the component 34 extends into and communicates with the internal volume of the receptacle. After a desired time in their advanced position, the tools 50 are moved to their retracted position so that the working ends 54 of the tools 50 are clear of the parison 12 and the component 34 to permit removal of the parison 12, with the component 34 attached thereto, from the recess 36 and the mold 24, 26. The parison halves can then be joined together, such as by welding, to form the receptacle or other article, or, the parison halves can be joined before the tools 50 are moved to their retracted position, or at any other time.

Figure 5:
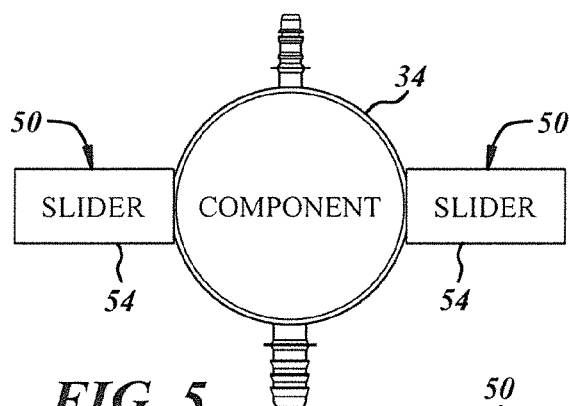
FIGS. 5-10 are diagrammatic plan views showing different exemplary implementations of tools.
Figure 6:
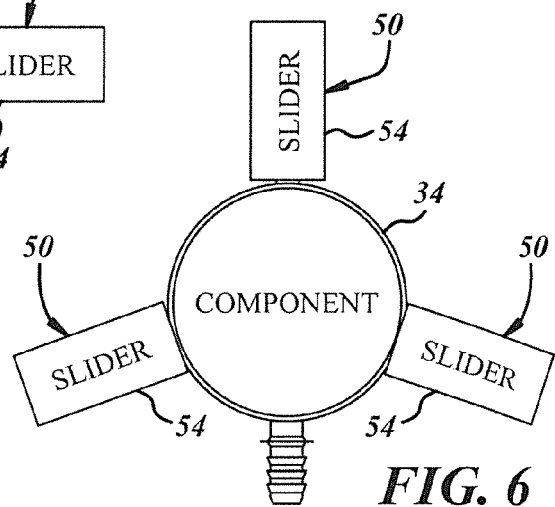
Figure 7:
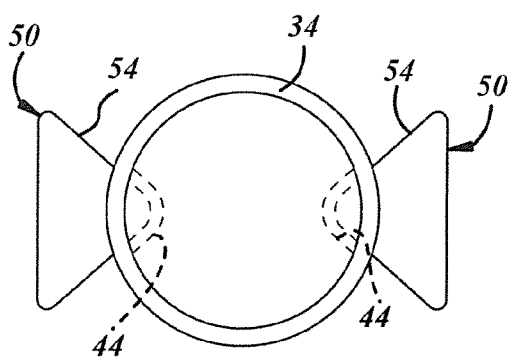
Figure 8:
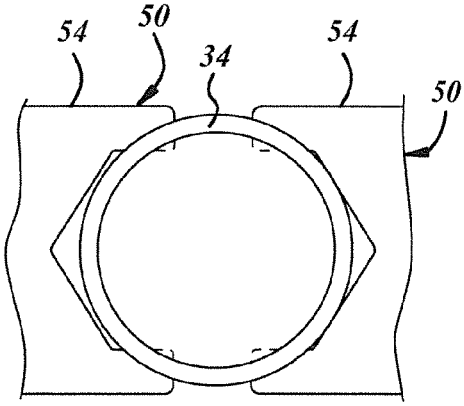
Figure 9:
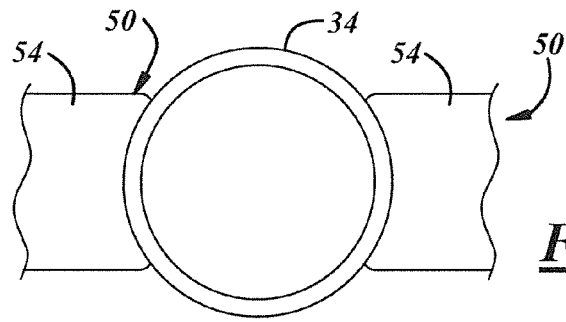
Figure 10:
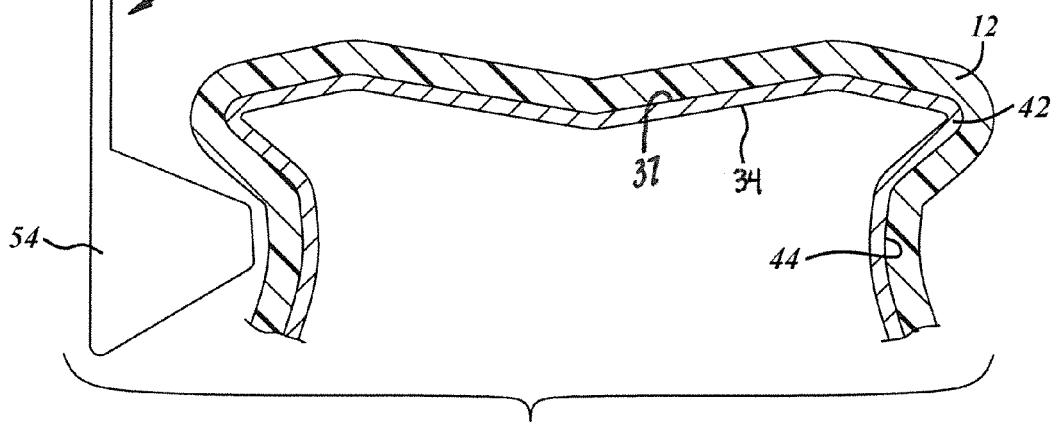

As shown in FIGS. 5 and 6, one or more tools 50 may be provided to displace portions of the parison relative to the component, to move spaced apart portions of the parison into one or more voids of the component to more securely connect the component to the parison. While two and three tools 50 are shown, substantially any number of tools 50 may be used as desired to effect a connection between the component 36 and the parison 12. The tools 50 may be evenly or unevenly circumferentially spaced, as desired. FIGS. 7-9 illustrate tools having differently shaped working ends 54 or surfaces which may displace the parison material in different manners relative to the component. Any desired shape of the working ends 54 may be used in addition to using any desired number of tools to provide a desired movement of the parison material and entrapment of the component 34 in the parison material. In using tools 50 with differently shaped end surfaces, only a very minor portion of the component may be overlapped by the parison material, or substantially all of the flange (or other portion of the component) may be trapped within the parison material, as desired. Still further, FIG. 10 illustrates that the working ends 54 may have a different shape or configuration in a generally axial direction, that is, they may have greater thickness to move a greater axial length of the parison material relative to the component as compared to a relatively thin, flat working surface. In this way, the component 34 and the tool(s) 50 can be constructed in a wide variety of configurations and arrangements to facilitate attaching the component to the parison wall during the molding process.

Accordingly, a method of connecting a component to a molded article, may include disposing a component adjacent to a wall of the article being molded, folding a portion of the parison wall over a portion of the component while the wall is still at least partially molten, and permitting the wall of the article being molded to cool with a portion of the component still overlapped by the wall. The molded article can be of substantially any shape and arrangement and need not be hollow or entirely hollow. The description of the exemplary blow-molded receptacle is not intended to limit the applications and arrangements to which the method and apparatus can be applied. The component can take many forms, include a bracket or other device that merely supports another component.

While the fauns of the invention herein disclosed constitute presently preferred embodiments, many others are possible. For example, a recess 36 in the mold 24, 26 may not be needed. If no recess 36 is provided, the tools 50 may be initially retracted until the component is disposed adjacent to the parison wall, and then the tools may be advanced toward the component to move portion of the parison wall around an edge of the component and then inwardly to fold the material into a void or around an edge of the component. Thereafter, the tool may be retracted to its initial position. The tool may be advanced and retracted linearly (e.g. a first linear movement forward and a second linear movement inward toward the component), along a pivoted or arcuate path, or in any other suitable way. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A method of connecting a component to a blow molded article, comprising:
    disposing a component having at least one recess opening outwardly of the component adjacent to a wall of the article being blow molded;
    lapping the at least one recess of the component with a portion of the wall of the article being blow molded while the wall portion is still at least partially molten, so that the at least one recess of the component is received between two spaced-apart portions of the wall to connect the component to the wall; and
    permitting the wall of the article being blow molded to cool with said at least one recess of the component still lapped by the spaced-apart portions of the wall to maintain the connection of the component to the wall.

2. The method of claim 1 wherein overlapping a portion of the component with a portion of the blow molded wall is accomplished by moving at least one tool relative to the component so that the tool engages a portion of said wall and moves said portion of the wall into said at least one recess until said portion of the wall laps said at least one recess of the component.

3. The method of claim 1 wherein the component includes least two recesses and portions of the wall are moved at least partially into the at least two recesses during the lapping step to connect the component to the wall.

4. The method of claim 1 wherein the component includes a flange and the portion of the wall is folded around the flange so that portions of the wall overlies two opposed sides of the flange and the flange is trapped between said portions of the wall.

5. The method of claim 2 wherein said at least one tool includes at least two spaced apart tools each adapted to move relative to the component a different portion of the wall of the article into said at least one recess.

6. The method of claim 1 wherein disposing a component adjacent to a wall of the article being molded is accomplished by pressing an end surface of the component against the wall and displacing a portion of the wall into said at least one recess and lapping a portion of the component with a portion of the article being molded is accomplished after said end surface of the component is pressed against the wall.

7. A system for attaching a component to a receptacle, comprising:
    a blow mold defining part of a forming surface against which the receptacle is blow molded, and at least one tool cavity open to the forming surface; and
    a tool disposed at least partially within the tool cavity and movable relative to the forming surface from a retracted position to an advanced position, the tool having a working surface that engages blow molding material forming the receptacle at least when the tool is moved to its advanced position to move blow molding material into at least one recess in a component and opening outwardly of the component to attach to and hold said component to the receptacle in a fixed position relative to the receptacle.

8. The system of claim 7 wherein the mold includes a mold recess defining part of a forming surface against which the receptacle is blow molded, and said tool cavity is open to the mold recess with the tool movable within the tool cavity and relative to the recess to move material into the at least one recess of the component to hold said component in position relative to the receptacle.

9. The system of claim 8 wherein the mold recess is sized to receive an end surface of the component therein, with material forming the receptacle disposed adjacent to the end surface and within the mold recess of the blow mold.

\* \* \* \* \*

UNITED STATES PATENT AND TRADEMARK OFFICE
CERTIFICATE OF CORRECTION

PATENT NO. : 8,691,139 B2
APPLICATION NO. : 13/737174
DATED : April 8, 2014
INVENTOR(S) : Peter Grauerl Page 1 of 1

It is certified that error appears in the above-identified patent and that said Letters Patent is hereby corrected as shown below:

In the Claims:

Column 6, Line 5, after "includes" insert -- at --.

Signed and Sealed this
Eighth Day of July, 2014

Michelle K. Lee
*Deputy Director of the United States Patent and Trademark Office*